United States Patent
Naoe et al.

(10) Patent No.: US 6,582,815 B2
(45) Date of Patent: Jun. 24, 2003

(54) MAGNETIC RECORDING MEDIUM AND MANUFACTURING METHOD OF THE SAME

(75) Inventors: Koji Naoe, Kanagawa (JP); Kiyomi Ejiri, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/081,093

(22) Filed: Feb. 21, 2002

(65) Prior Publication Data

US 2003/0049493 A1 Mar. 13, 2003

(30) Foreign Application Priority Data

Feb. 22, 2001 (JP) ........................................ 2001-047138

(51) Int. Cl.[7] .............................................. G11B 5/708
(52) U.S. Cl. ................ 428/328; 428/336; 428/694 BA; 428/694 BS; 428/694 BN; 428/694 BR
(58) Field of Search .................................. 428/328, 336, 428/694 BA, 694 BS, 694 BN, 694 BR, 900; 427/131

(56) References Cited

U.S. PATENT DOCUMENTS 6,162,528 A * 12/2000 Ochi ........................... 428/141

FOREIGN PATENT DOCUMENTS

EP     0 899 722 A2 *  3/1999

* cited by examiner

Primary Examiner—Steven A. Resan
(74) Attorney, Agent, or Firm—Stroock & Stroock & Lavan LLP

(57) ABSTRACT

Provided is a magnetic recording medium suitable for high density digital recording, in detail, a magnetic recording medium suitable for reproduction with an MR head. A magnetic recording medium comprising a nonmagnetic layer comprising a nonmagnetic powder and a binder and a magnetic layer comprising a ferromagnetic metal powder, a binder and a nonmagnetic powder provided in this order on a flexible nonmagnetic support. Said magnetic layer has an average thickness ranging from 0.01 to 0.2 $\mu$m, said ferromagnetic metal powder has a mean major axis length of less than 100 nm and a mean minor axis length of less than 20 nm, said nonmagnetic powder comprised in the magnetic layer is a granular or acicular nonmagnetic powder, the ratio of the mean particle size or minor axis length of said nonmagnetic powder to said mean minor axis length is higher than 0.2 and equal to or less than 2.5, and the maximum surface area of magnetic pinholes is equal to or less than 50% of a bit surface area.

10 Claims, No Drawings

MAGNETIC RECORDING MEDIUM AND MANUFACTURING METHOD OF THE SAME

FIELD OF THE INVENTION

The present invention relates to a magnetic recording medium capable of high density recording, in particular, reproduced with an MR head.

BACKGROUND OF THE INVENTION

Magnetic recording media are widely employed in which a magnetic layer comprised of a ferromagnetic iron oxide, Co-modified ferromagnetic iron oxide, $CrO_2$, ferromagnetic alloy powder or the likes dispersed in binders is coated on a nonmagnetic support. Recording wavelengths have tended to shorten as recording densities have increased in recent years. The problems of self-demagnetization loss during recording and thickness loss during reproducing, where a thick recording layer results in low output, have become substantial. For this reason, recording layers are made thin. However, when a magnetic layer about equal to or less than 2 $\mu$m is directly coated on a support, the nonmagnetic support tends to affect the surface of the magnetic layer, and electromagnetic characteristics and dropout tend to deteriorate.

One way of solving this problem is to employ a simultaneous multilayer coating method to apply a nonmagnetic layer as a lower layer and then apply a thin magnetic coating liquid of high concentration (Japanese Unexamined Patent Publication (KOKAI) Showa Nos. 63-191315 and 63-187418). These inventions have permitted marked improvement in yield and made it possible to achieve good electromagnetic characteristics. However, magnetic recording media with further high density are required.

Inductive heads that record and reproduce by magnetic inductance have conventionally been employed as magnetic heads. However, in recent years, MR heads employing changes in magnetic resistance based on the level of magnetization of the medium have become popular in the field of high-density digital recording, primarily in hard disks, and are continuing to gain ground in the fields of high-density recording tapes, flexible disks, and the like.

Substantial research is being conducted and numerous papers written on the various problems of magnetic recording with MR heads. When reproducing with MR heads, since MR heads are highly sensitive, a medium with low noise is better suited than a medium with high output. Thus, various techniques of reducing the magnetic interaction between magnetic materials have been disclosed. For example, several techniques are known in which, in the case of thin films, a nonmagnetic layer is sandwiched between multilayered magnetic layers, magnetic materials are formed in pores of a nonmagnetic film or, in the case of vapor deposited tapes, CoO is formed on the surface of magnetic particle crystals.

In particulate media, which is the technical field of the present application, the dilution of the magnetic layer with nonmagnetic materials to lower the ratio of volume of magnetic powder to the volume of magnetic layer has been proposed, as in Japanese Unexamined Patent Publication (KOKAI) Heisei No. 11-73640. Basically, this is a specific technique of blocking magnetostatic coupling of magnetic material with nonmagnetic material or antiferromagnetic substances. However, in the course of diluting the magnetic layer with nonmagnetic material, unless the magnetic material and nonmagnetic material are uniformly dispersed and aggregation of nonmagnetic material is prevented, magnetic pinholes occur, DC demagnetization noise (modulation noise) increases, and bit output amplitude fluctuation occurs, resulting in an increased error rate.

The present inventors conducted extensive research into improving the aptitude with MR heads, further developed the idea of Japanese Unexamined Patent Publication (KOKAI) Heisei No. 11-73640, and discovered a specific medium where, in the course of diluting the magnetic layer with nonmagnetic material, the magnetic material and nonmagnetic material are uniformly dispersed and the nonmagnetic material does not form aggregates. Thus, a medium with low AC demagnetization noise and DC demagnetization noise (modulation noise) was discovered.

SUMMARY OF THE INVENTION

The object of the present invention is to provide a magnetic recording medium having good electromagnetic characteristics with MR heads and good production properties, and more specifically, to provide a magnetic recording medium affording good recording and reproduction performance at short recording wavelengths and good yields.

To achieve the above-stated objects, the present inventors conducted extensive research into magnetic layer structures and magnetic characteristics, resulting in the present invention.

That is, the present invention relates to a magnetic recording medium comprising a nonmagnetic layer comprising a nonmagnetic powder and a binder and a magnetic layer comprising a ferromagnetic metal powder, a binder and a nonmagnetic powder provided in this order on a flexible nonmagnetic support, wherein said magnetic layer has an average thickness ranging from 0.01 to 0.2 $\mu$m, said ferromagnetic metal powder has a mean major axis length of less than 100 nm and a mean minor axis length of less than 20 nm, said nonmagnetic powder comprised in the magnetic layer is a granular or acicular nonmagnetic powder, the ratio of the mean particle size or minor axis length of said nonmagnetic powder to said mean minor axis length is higher than 0.2 and equal to or less than 2.5, and the maximum surface area of magnetic pinholes is equal to or less than 50% of a bit surface area.

Further, the present invention relates to a method of manufacturing the magnetic recording medium of claim 1 comprising coating a coating liquid for a nonmagnetic layer comprising a nonmagnetic powder and a binder and a coating liquid for a magnetic layer comprising a ferromagnetic metal powder, a binder and a nonmagnetic powder in this order on a flexible nonmagnetic support, wherein a liquid comprising said ferromagnetic metal powder and said binder and a liquid comprising said nonmagnetic powder and said binder are independently kneaded and dispersed until the dispersibility of said ferromagnetic metal powder and said nonmagnetic powder are optimized, and two liquid obtained are mixed and dispersed immediately prior to coating to obtain said coating liquid for a magnetic layer.

The manufacturing method further desirably comprises a step of, once the nonmagnetic layer coating liquid and magnetic layer coating liquid have been applied to form coatings, imparting to the coatings an orientation of a magnetic field intensity of 0.4 to 1.5 times the Hc of the above-mentioned ferromagnetic metal powder in the longitudinal direction.

In the magnetic recording medium of the present invention, since the magnetic powder particles are in a magnetically separated state, the particle noise, that is, AC demagnetization noise, can be reduced, as well as the state in which the nonmagnetic powder and magnetic powder are present in the magnetic layer is rendered uniform, and fluctuation in the level of magnetization is inhibited, thereby reducing DC demagnetization noise (modulation noise). That is, when reproducing the magnetic recording medium of the present invention with a MR head, a high C/N ratio is achieved. Further, since the magnetic powder is diluted with a nonmagnetic powder, reducing the level of residual magnetization in the magnetic layer, thereby saturation of the MR head can be avoided.

The present invention will be described here.

MR heads yield higher reproduction output than inductive heads. In conventional inductive heads, considerable examination in which the residual magnetization of the magnetic layer was pushed up has been conducted. However, it is known that in MR heads, high residual magnetization is not necessarily related to improvement of performance since noise is high.

The reason that the mean thickness δ of the magnetic layer is specified as falling within the range of 0.01 to 0.2 μm in the present invention is as follows. When the mean thickness δ of the magnetic layer is excessively thin, the magnetization level is excessively low and it becomes impossible to detect the signal due to overall system noise. When the magnetic layer thickness δ is larger and Brδ exceeds a given value determined by various factors relating to the head, saturation of MR head occurs (the output does not increase, noise alone increases, and the C/N ratio drops). Thus, as in the present invention, Br reduction by dilution with nonmagnetic powder is an effective method. However, at greater than 0.2 μm, further reduction in Br becomes necessary as a countermeasure to saturation of the MR head, but since the ratio of magnetic powder present in the magnetic layer is thereby reduced, the C/N ratio decreases.

The reason the ratio (lh/lm) of the mean particle size or minor axis length lm of the nonmagnetic powder to the minor axis length of the magnetic powder lm contained in the magnetic layer exceeds 0.2 but is equal to or less than 2.5 (0.2×lm<lh<2.5×lm) is based on balancing the reduction in magnetic interaction and magnetic pinholes. That is, when the mean particle size or minor axis length lh of the nonmagnetic powder is such that the ratio (lh/lm) is equal to or less than 0.2, the reducing effect on magnetic interaction decreases and the diluting effect with nonmagnetic powder decreases. Further, when the ratio (lh/lm) exceeds 2.5, magnetic pinholes increase and DC demagnetization noise increases, resulting in a negative effect due to dilution with nonmagnetic powder.

The invention described in above-cited Japanese Unexamined Patent Publication (KOKAI) Heisei No. 11-73640 also describes a magnetic layer comprising nonmagnetic powder, and specifies a weight ratio of magnetic powder to nonmagnetic powder. However, what effectively reduces magnetic interaction is essentially the ratio of volume of magnetic powder to the volume of magnetic layer, and what to be solved is that the state, in which magnetic powder particles are magnetically separated with nonmagnetic powder particles entered between them, is created. However, there is no description on the ratio of volume of magnetic powder to the volume of magnetic layer in Japanese Unexamined Patent Publication (KOKAI) Heisei No. 11-73640. Nor does Japanese Unexamined Patent Publication (KOKAI) Heisei No. 11-73640 mention magnetic pinholes.

When the amount of nonmagnetic powder comprised in the magnetic layer is increased, aggregates of the nonmagnetic powder particles and non-dispersed portions become magnetic pinholes. These magnetic pinholes do not constitute a problem at a surface area on the level of one or two magnetic particles and when they are uniformly present. However, when they are nonuniform and the surface area of the magnetic pinholes is large, there is a problem due to the generation of DC demagnetization noise (modulation noise).

In the invention described in Japanese Unexamined Patent Publication (KOKAI) Heisei No. 11-73640, only α-$Fe_2O_3$ is given as an example of nonmagnetic powder (claim 2). However, only by employing α-$Fe_2O_3$ as nonmagnetic powder, the surface area of the magnetic pinholes cannot be decreased to the level of several nonmagnetic particles and the uniformity of distribution of magnetic powder and nonmagnetic powder cannot be increased.

By contrast, in the present invention, the relation between the mean particle size or minor axis length lh of the nonmagnetic powder contained in the magnetic layer and the minor axis length lm of the magnetic powder is specified as 0.2×lm<lh<2.5×lm, thereby simultaneously solving the above-described problems of reducing magnetic interaction and magnetic pinholes.

To avoid disrupting the orientation of magnetic particles (to reduce magnetic interaction), the particle size of the nonmagnetic powder, or, when acicular, the minor axis length lh, and the minor axis length lm of the magnetic powder particles must satisfy the above-stated relation. However, the above-cited publication discloses nothing with regard to the particle shape or size of the nonmagnetic powder. As set forth above, when the minor axis length or particle size lh of the nonmagnetic powder particles becomes excessively large relative to the minor axis length lm of the magnetic powder particles, orientation properties are compromised. Further, when the minor axis length or particle size lh of the nonmagnetic powder falls below the above-stated range, there are problems in that the nonmagnetic powder tends to aggregate and not to disperse, resulting in compromised orientation properties in the magnetic powder and an increase in the surface area of magnetic pinholes, or decreased uniformity.

In the magnetic recording medium of the present invention, the maximum surface area K of magnetic gaps (pinholes) is equal to or less than 50 percent of the bit surface area. When maximum surface area K of the magnetic gaps (pinholes) exceeds 50 percent of the bit surface area, bit amplitude variation causes a sharp rise in the error rate. Maximum surface area K of the magnetic gaps (pinholes) desirably falls within a range of 0.1 to 20 percent of the bit surface area.

The magnetic recording medium of the present invention, and more particularly, a magnetic recording medium in which the maximum surface area K of magnetic gaps (pinholes) is equal to or less than 50 percent of the bit surface area, can be manufactured by a method in which the magnetic layer coating liquid is prepared by separately kneading and dispersing a liquid comprising a ferromagnetic metal powder and binder and a liquid comprising a nonmagnetic powder and binder, and admixing and dispersing the two liquids obtained immediately prior to application.

The reason the magnetic liquid comprising the ferromagnetic metal powder and binder and the nonmagnetic liquid comprising nonmagnetic powder and binder are separately kneaded and dispersed, then admixed and dispersed immediately prior to application in the manufacturing of the magnetic layer coating liquid, is to reduce the amount of nonmagnetic powder present in an undispersed state and to manufacture a magnetic coating liquid in which magnetic powder particles and nonmagnetic powder particles are uniformly present at a particle level (in a dispersed state). When the nonmagnetic powder and magnetic powder are simultaneously kneaded and dispersed, due to differences in the rates of progressing dispersion (generally, a nonmagnetic powders disperse more slowly than ferromagnetic metal powders), undispersed nonmagnetic powder results from failed dispersion, and aggregation of magnetic powder results from excessive dispersion. Separate dispersion permits optimization of the dispersion properties of the magnetic powder and nonmagnetic powder, and thus prevents undispersed material and aggregates.

In the manufacturing method of the present invention, the orientation conditions following coating are important in addition to the preparation of the above-described magnetic layer coating liquid. Generally, in the magnetic recording medium of in the form of a tape, orientation is imparted by arraying the magnetic powder particles in the in-plane longitudinal direction during coating and drying.

For high σs magnetic powders such as ferromagnetic metal powders, aggregation of the magnetic powder itself tends to occur and there is a risk of nonuniform distribution of the nonmagnetic powder and magnetic powder when an orientation magnetic field of 1.5 times or greater the Hc is applied to the liquid in a fluid state. That is, there is a risk that the surface area of magnetic pinholes will become large and that the number of magnetic pinholes in a given surface area will decrease.

Thus, in the present invention, following the application of the nonmagnetic layer coating liquid and the magnetic layer coating liquid to form coatings, the intensity of the orientation magnetic field applied in the in-plane longitudinal direction is desirably set to equal to or less than 1.5 times the Hc of the ferromagnetic metal powder. However, when the intensity of the orientation magnetic field is less than 0.4 times the Hc of the ferromagnetic metal powder, it becomes difficult to achieve adequate orientation and there is a risk of increased magnetic interaction and noise. Thus, a level equal to or higher than 0.4 times the Hc is preferred.

In disk magnetic recording media, in-plane random orientation falling within the above-stated range of orientation intensity is desirable for the above-stated reasons.

The ferromagnetic metal powder comprised in the magnetic layer is desirably a ferromagnetic alloy powder with a saturation magnetization σs of less than 130 $Am^2/kg$ and equal to or higher than 70 $Am^2/kg$, a coercivity Hc equal to or higher than 158 kA/m, a mean major axis length of less than 100 nm, a mean minor axis length of less than 20 nm, and a crystallite size equal to or less than 13 nm. The mean major axis length is desirably equal to or higher than 40 nm and the mean minor axis length is desirably equal to or higher than 6 nm.

The reasons for these numerical limits are given below.

Theoretically, it is known that the larger the mean magnetic moment $\mu p$ of the magnetic particles, the greater the medium noise (Norihashi, Japan Journal of Applied Magnetics, Vol.21, No.4-1, p.149-(1997)). $\mu p = \sigma s \times \rho \times V$, where σs denotes the magnetic moment per mass of magnetic powder, σ denotes density, and V denotes average volume. Accordingly, a low σs is desirable. Japanese Unexamined Patent Publication (KOKAI) Heisei No. 11-73640 gives a desired range of σs equal to or higher than 130 $Am^2/kg$. However, in reproduction with a MR head, less than 130 $Am^2/kg$ is desirable. Since an excessively low σs results in a low constant of anisotropy and a low Hc, equal to or higher than 70 $Am^2/kg$ is desirable in alloy powders.

From the above-stated equation, a small average volume V is desirable. Accordingly, desirable are the mean major axis length less than 100 nm, the mean minor axis length less than 20 nm, and the crystallite size equal to or less than 13 nm.

Although the above-described preference in magnetic powder may be deducible from the above-cited theories, the present invention is characterized in that a new magnetic recording medium, unobtainable by known theory or the technique disclosed in Japanese Unexamined Patent Publication (KOKAI) Heisei No. 11-73640, is obtained by mixing the above-described magnetic particles with specific nonmagnetic particles.

The preferred mode of the magnetic layer of the magnetic recording medium of the present invention is as follows.

Based on a balance of the reduction in magnetic interaction and the level of magnetization, the ratio of volume of magnetic powder to the volume of magnetic layer preferably ranges from 15 to 45 percent, more preferably from 20 to 35 percent, and still more preferably from 20 to 30 percent. The ratio p of the volume of the nonmagnetic powder to the volume of the magnetic powder is desirably 0.05<p<2. When ratio p is smaller than 0.05, the reduced magnetic interaction effect decreases. When ratio p exceeds 2, since the orientation properties of the magnetic powder deteriorate, it becomes difficult to maintain uniformity of the magnetic powder and nonmagnetic powder during orientation. The ratio of volume of magnetic powder to the volume of magnetic layer is determined by nonmagnetic substances (nonmagnetic powder, binder, air (voids)) other than the magnetic powder. In the present invention, mainly quantity of nonmagnetic powder added is changed to adjust the ratio of volume of magnetic powder to the volume of magnetic layer.

The mean thickness δ of the magnetic layer ranges from 0.02 to 0.2 $\mu m$, preferably from 0.02 to 0.1 $\mu m$. For the shortest bit length Tb of the recording signal, $Tb/20 \leq \delta \leq Tb$ is desirable, and $Tb/10 \leq \delta \leq 2Tb/3$ is further preferred.

In the magnetic layer, the nonmagnetic powder admixed with the magnetic powder is suitably in the form of acicular particles with a major axis length equal to or less than 0.2 $\mu m$, preferably equal to or less than 0.15 $\mu m$, an acicularity ratio ranging from 3 to 20, preferably from 5 to 15, or in the form of granular particles with a mean particle size equal to or less than 50 nm, preferably from 1 to 40 nm.

Examples of such nonmagnetic powders are oxides such as $\alpha$-$Fe_2O_3$, $TiO_2$, $ZrO_2$, $SnO_2$, $Al_2O_3$, $SiO_2$, $CeO_2$, ZnO, and $Cr_2O_3$; nonmagnetic metal powders of Cu, Ag, Cr, Al, and the like; salts such as $BaSO_4$ and $CaCO_3$; carbon black; and microgranular resin powders such as melamine resins. When employing a binder having a polar group suited to dispersion of magnetic powder, a metal oxide is preferred. Further, since electrical discharge is a problem in MR heads, the use of metal particles or carbon black having low electrical resistivity to impart electrical conductivity is also effective. These powders, so long as they are of the shapes and fall within the size range set forth above, may be employed singly or in combinations of two or more.

The magnetic powder employed in the magnetic recording medium will be described. In the present invention, a ferromagnetic alloy powder is employed as the magnetic powder. The saturation magnetization moment σs of the ferromagnetic alloy powder is less than 130 $Am^2/kg$ and equal to or higher than 70 $Am^2/kg$, preferably equal to or higher than 125 $Am^2/kg$ and equal to or higher than 80 $Am^2/kg$. At 130 $Am^2/kg$ and above, noise increases, and at less than 70 $Am^2/kg$, the Hc tends to decrease. As stated above, the Hc is desirably equal to or higher than 158 kA/m, preferably equal to or higher than 174 kA/m. Although a high Hc is desirable in that it yields good electromagnetic characteristics, 160 to 300 kA/m is practical. However, this limitation does not apply when it is possible to record even at high levels of Hc due to an increase in the Bs of the recording head. The magnetic particles are less than 100 nm in mean major axis length, preferably equal to or less than 80 nm. The crystallite size (X-ray particle diameter) is equal to or less than 13 nm, preferably equal to or less than 12 nm. The lower these values the better. However, a mean major axis length of equal to or higher than 40 nm to less than 100 nm and a crystallite size of equal to or higher than 6 nm to equal to or less than 13 nm are practical. When too small, the thermal stability of magnetization is compromised. The BET specific surface area preferably ranges from 40 to 100 $m^2/g$. When too large, dispersibility deteriorates.

The ferromagnetic alloy powder is comprised chiefly of Fe, and Co is preferably incorporated in solid solution to achieve a high Hc.

Known techniques can be employed to combine and manufacture the ferromagnetic alloy powder. In addition to the prescribed atoms, atoms such as the following may also be incorporated: Al, Si, S, Sc, Ti, V, Cr, Cu, Y, Mo, Rh, Pd, Ag, Sn, Sb, Te, Ba, Ta, W Re, Au, Hg, Pb, Bi, La, Ce, Pr, Nd, P, Mn, Zn, Ni, Sr and B.

The ferromagnetic metal powder may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307 and 48-39639; and U.S. Pat. Nos. 3,026,215, 3,031,341, 3,100,194, 3,242,005, and 3,389,014.

The above-described ferromagnetic alloy powders may comprise hydroxides or oxides. Examples of methods of achieving the σs specified in the present invention are forming a nonmagnetic oxide film (in an amount more than usual), or coating Al or Y, in an amount more than usual on the surface of the alloy powder.

The tap density of the ferromagnetic alloy powder is desirably 0.2 to 0.8 g/mL.

Optimization of the pH of the ferromagnetic alloy powder is desirable in view of a binder used together. The pH ranges from 4 to 12, preferably from 6 to 10. A lack of pores is desirable; the quantity thereof is equal to or less than 20 volume percent, preferably equal to or less than 5 volume percent. To achieve a switching field distribution (SFD) in the ferromagnetic powder equal to or less than 0.6, it is necessary for the Hc distribution of the ferromagnetic powder to be low. Thus, there are methods such as achieving a good particle distribution of goethite and preventing γ-hematite sintering.

Conventionally known thermoplastic resins, thermosetting resins, reactive resins, and mixtures of the same may be employed in both the magnetic layer and nonmagnetic layer as binders in the present invention. Suitable thermoplastic resins have a glass transition temperature of −100 to 150° C., a number average molecular weight of 1,000 to 200,000, preferably 10,000 to 100,000, and a degree of polymerization of about 50 to 1,000.

Examples are polymers and copolymers comprising structural units in the form of vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, or the like; polyurethane resins; and various rubber resins. Examples of thermosetting resins and reactive resins are phenol resins, epoxy resins, polyurethane curing resins, urea resins, melamine resins, alkyl resins, acrylic reactive resins, formaldehyde resins, silicone resins, epoxy-polyamide resins, mixtures of polyester resins and isocyanate prepolymers, mixtures of polyester polyols and polyisocyanates, and mixtures of polyurethane and polyisocyanates.

These resins are described in detail in the "Handbook of Plastics" put out by Asakura Shoten. Known electron beam curing resins can be employed in the nonmagnetic and magnetic layers. Examples thereof and methods of manufacturing the same are described in detail in Japanese Unexamined Patent Publication (KOKAI) Showa No. 62-256219. These resins may be employed singly or in combination. The preferred resin is a mixture of polyurethane resin and one or more selected from among the group consisting of vinyl chloride resin, vinyl chloride vinyl acetate resin, vinyl chloride vinyl acetate vinyl alcohol resin, and vinyl chloride vinyl acetate maleic anhydride copolymer or combination thereof with polyisocyanate. A polyurethane resin of known structure may be employed, such as polyester polyurethane, polyether polyurethane, polyether polyester polyurethane, polycarbonate polyurethane, polyester polycarbonate polyurethane, and polycaprolactone polyurethane. To improve dispersion properties and durability, a compound, in which at least one polar group selected from among the group consisting of COOM, $SO_3M$, $OSO_3M$, $P=O(OM)_2$, O—P—$O(OM)_2$ (wherein M denotes a hydrogen atom or alkali metal base), OH, $NR_2$, $N^+R_3$ (wherein R denotes a hydrocarbon group), epoxy groups, SH, and CN has been incorporated by copolymerization or addition reaction, is desirably employed as needed in all of the above-described binders. The quantity of the polar group is from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation.; MPR-TA, MPR-TA5, MPR-TAL, MPR-TSN, MPR-TMF, MPR-TS, MPR-TM, and MPR-TAO from Nisshin Kagaku Kogyo K.K.; 1000W, DX80, DX81, DX82, DX83, and 100FD from Denki Kagaku Kogyo K.K.; MR-105, MR110, MR100, and 400X-110A from Nippon Zeon Co., Ltd.; Nippollan N2301, N2302, and N2304 from Nippon Polyurethane Industry Co., Ltd.; Pandex T-5105, T-R3080, T-5201, Burnock D-400, D-210-80, Crisvon 6109, and 7209 from Dainippon Ink And Chemicals, Incorporated.; Vylon UR8200, UR8300, UR-8600, UR-5500, UR-4300, RV530, and RV280 from Toyobo Co., Ltd.; Dipheramin 4020, 5020, 5100, 5300, 9020, 9022, and 7020 from DainiclhiSeika Colar & Chemicals Mfg. Co., Ltd.; MX5004 from Mitsubishi Chemical Corp.; Sunprene SP-150, TIM-3003 and TIM-3005 from Sanyo Chemical Industries, Ltd.; and Salan F310 and F210 from Asahi Chemical Industry Co., Ltd.

The binder employed in the magnetic layer of the present invention is employed in a range of 2 to 30 weight percent, preferably 5 to 25 weight percent with respect to the ferromagnetic powder. When employing vinyl chloride resin, the range is 1 to 30 weight percent, when employing polyurethane resin, 1 to 20 weight percent, and when employing polyisocyanate, 1 to 20 weight percent; these are preferably combined for use. In the present invention, when employing polyurethane, preferable are the glass transition temperature from −50° to 100° C., the elongation at break from 100 to 2,000 percent, the stress at break from $4.9 \times 10^{-6}$ to $9.8 \times 10^{-4}$ GPa (0.05 to 10 kg/cm$^2$), and the yield point from $4.9 \times 10^{-6}$ to $9.8 \times 10^{-4}$ GPa (0.05 to 10 kg/cm$^2$). The magnetic recording medium of the present invention comprises two or more layers. Accordingly, as needed, the quantity of binder; the proportion of vinyl chloride resin, polyurethane resin, polyisocyanate, or some other resin in the binder; the molecular weight of each resin comprising the magnetic layer; the quantity of polar groups; and the above-stated physical characteristics of the resin may be changed in the nonmagnetic layer, upper magnetic layer, or some other magnetic layer. Known techniques for the multilayered magnetic layer may be applied. For example, when changing the quantity of binder in the upper/lower magnetic layer or the nonmagnetic layer, increasing the quantity of binder in the upper magnetic layer effectively decreases scratching of the surface of the magnetic layer, and increasing the quantity of binder in layers other than the magnetic layer imparts flexibility to achieve good head touch.

Examples of polyisocyanates preferably employed in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in both the nonmagnetic layer and the magnetic layer by exploiting differences in curing reactivity.

Examples of types of carbon black that are suitable for use in the magnetic layer of the present invention are: furnace black for rubber, thermal for rubber, black for coloring, and acetylene black. A specific surface area of 5 to 500 m$^2$/g, a DBP oil absorption amount of 10 to 400 mL/100 g, a particle diameter of 5 nm to 300 nm, a pH of 2 to 10, a moisture content of 0.1 to 10 weight percent, and a tap density of 0.1 to 1 g/mL are desirable. Specific examples of types of carbon black employed in the present invention are: BLACK PEARLS 2000, 1300, 1000, 900, 800, 700 and VULCAN XC-72 manufactured by Cabot Corporation; #80, #60, #55, #50 and #35 manufactured by Asahi Carbon Co. Ltd.; #2400B, #2300, #900, #1000, #30, #40 and #10B manufactured by Mitsubishi Kasei Kogyo Corp.; and CONDUCTEX SC, RAVEN 150, 50, 40 and 15 manufactured by Columbia Carbon Co. Ltd. The carbon black employed may be surface-treated with a dispersant or the like, or grafted with resin, or have a partially graphite-treated surface. The carbon black may be dispersed in advance into the binder prior to addition to the magnetic coating material. These carbon blacks may be used singly or in combination.

When employing carbon black, the quantity preferably ranges from 0.1 to 30 weight percent with respect to the ferromagnetic powder. In the magnetic layer, carbon black works to prevent static buildup, reduce the coefficient of friction, impart light-blocking properties, enhance film strength, and the like; the properties vary with the type of carbon black. Accordingly, it is, as a matter of course, possible for carbon black used in the present invention to properly use varying the kinds, quantity and combination between the upper magnetic layer and lower nonmagnetic layer according to the purpose on the basis of the above-mentioned characteristics, such as particle size, oil absorption capacity, electrical conductivity, and pH. For example, the Carbon Black Handbook compiled by the Carbon Black Association may be consulted for types of carbon black suitable for use in the magnetic layer of the present invention.

In the magnetic layer of the present invention, known materials with a Mohs hardness equal to or higher than 6, principally in the form of $\alpha$-alumina with an a conversion rate equal to or higher than 90 percent, $\beta$-alumina, silicon carbide, chromium oxide, cerium oxide, $\alpha$-iron oxide, corundum, artificial diamond, silicon nitride, titanium carbide, titanium oxide, silicon dioxide, and boron nitride, can be employed singly or in combination as abrasives in addition to the nonmagnetic powder. Further, complexes of these abrasives (one abrasive that has been surface treated with another abrasive) may also be employed. There are cases where compounds or elements other than the principal components are contained in these abrasives; the effect does not change so long as the principal components account for equal to or higher than 90 weight percent. Abrasives with a particle size of 0.01 to 2 $\mu$m may be employed. However, since the magnetic layer is thin, a particle size of 0.01 to 0.3 $\mu$m is preferred. Further, as needed, the same effect may be imparted by combining abrasives of differing particles sizes or expanding the particle size distribution of a single abrasive.

A tap density of 0.3 to 2 g/mL, a moisture content of 0.1 to 5 weight percent, a pH of 2 to 11, and a specific surface area of 1 to 30 m$^2$/g are preferred. The abrasive employed in the present invention may be acicular, spherical, or cubic in shape, but a partially angular shape is preferred for its good abrasive properties.

Specific examples of abrasives employed in the present invention are AKP-20, AKP-30, AKP-50, HIT-50, and HIT-100 from Sumitomo Chemical Co., Ltd.; G5, G7, and S1 from Nippon Chemical Industrial Co., Ltd.; and TF-100 and TF-140 from Toda Kogyo Corp. Different types, quantities, and combinations of abrasive may be employed in the magnetic layer (upper/lower layer) and nonmagnetic layer of the present invention based on the objective. These abrasives may be first dispersed in binder in advance and then added to the magnetic coating liquid.

The detailed content of the lower nonmagnetic layer will be described below. The nonmagnetic powder suitable for use in the nonmagnetic layer of the present invention may be selected from inorganic compounds, examples of which are: metal oxides, metal carbonates, metal sulfates, metal nitrides, metal carbides, metal sulfides and the like. Examples of inorganic compounds are $\alpha$-alumina having an $\alpha$-conversion rate equal to or higher than 90 percent, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable are titanium dioxide, zinc oxide, iron oxide and barium sulfate. Even more preferred are titanium dioxide and $\alpha$-iron oxide. The particle size of these nonmagnetic powders preferably ranges from 0.05 to 2 $\mu$m, but nonmagnetic powders of differing particle size may be combined as needed, or the particle diameter distribution of a single nonmagnetic powder may be broadened to achieve the same effect. What is preferred most is the range of 0.01 to 0.2 μm. The shape may be any of acicular, granular or plate-shaped, and acicular shape is particular preferred.

The tap density ranges from 0.05 to 2 g/ml, preferably from 0.2 to 1.5 g/ml. The moisture content ranges from 0.1 to 5 weight percent, preferably from 0.2 to 3 weight percent. The pH ranges from 2 to 1 1, and the pH between 6 to 9 is particular preferred.

The specific surface area ranges from 1 to 100 m$^2$/g, preferably from 5 to 50 m$^2$ μg, further preferably from 7 to 40 m$^2$/g. The crystalline size preferably ranges from 0.01 to 2 μm. The oil absorption capacity using DBP ranges from 5 to 100 ml/100 g, preferably from 10 to 80 ml/g, further preferably from 20 to 60 ml/100 g. The specific gravity ranges from 1 to 12, preferably from 3 to 6. The shape may be any of acicular, spherical, polyhedral, or plate-shaped. The ignition loss is desirably equal to or less than 20 weight percent. The Mohs' hardness of the above-mentioned inorganic powder employed in the present invention is preferably equal to or higher than 4. The roughness factor of the powder surface preferably ranges from 0.8 to 1.5, more preferably from 0.9 to 1.2. The stearic acid (SA) adsorption amount ranges from 1 to 20 μmol/m$^2$, preferably from 2 to 15 μmol/m$^2$. The heat of wetting in 25° C. water of the nonmagnetic powder in the lower layer is preferably within the range of 2.0×10$^{-5}$ to 6.0×10$^{-5}$ J/cm$^2$ (200 to 600 erg/cm$^2$). A solvent with a heat of wetting within this range may also be employed. The number of water molecules on the surface appropriately ranges from 1 to 10 molecules per 100 Å at 100 to 400° C. The pH at the isoelectric point in water preferably ranges from 3 to 6.

The surface of these powders is preferably treated with $Al_2O_3$, $SiO_2$, $TiO_2$, $ZrO_2$, $SnO_2$, $Sb_2O_3$ or ZnO. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These can be employed singly or in combination. In addition, depending on the objective, a surface-treatment layer with a coprecipitated material may also be employed, the coating structure which comprises a first alumina coating and a second silica coating thereover or the reverse structure thereof may also be adopted. Depending on the objective, the surface-treatment layer may be a porous layer, with homogeneity and density being generally desirable.

Mixing carbon black into the lower layer achieves the known effects of lowering Rs. Examples of types of carbon black that are suitable for use are furnace black for rubber, thermal for rubber, black for coloring and acetylene black. The specific surface area ranges from 100 to 500 m$^2$/g, preferably from 150 to 400 m$^2$/g and the DBP oil absorption capacity ranges from 20 to 400 ml/100 g, preferably from 30 to 200 ml/100 g. The particle diameter ranges from 5 to 80 nm, preferably from 10 to 50 nm, further preferably from 10 to 40 nm. It is preferable that the pH ranges from 2 to 110, the moisture content ranges from 0.1 to 10% and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, 3150B, 3250B, #3750B, #3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd.

The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent with respect to the inorganic powder above and does not exceed 40 percent with respect to the total weight of the nonmagnetic layer. These types of carbon black may be employed singly or in combination. The Carbon Black Handbook compiled by the Carbon Black Association may be consulted for types of carbon black suitable for use in the present invention.

Examples of organic powders employed in the present invention are acryl styrene resin powders, benzoguanamine resin powders, melamine resin powders, and phthalocyanine pigments. Polyolefin resin powders, polyester resin powders, polyamide resin powders, polyimide resin powders, and polyfluoroethylene resin are employed. The manufacturing methods as described in Japanese Unexamined Patent Publication (KOKAI Showa Nos. 62-18564 and 60-255827 may be employed. These nonmagnetic powders are employed in a range of 20 to 0.1 by weight and 10 to 0.1 by volume of the binder. More preferably, the volume ratio of the binder is from 2.0 to 0.3 times the volume of the powder comprised in the lower layer. In magnetic recording media, an undercoating layer is generally provided to improve adhesion between the support and the magnetic layer or the like. This undercoating layer has a thickness equal to or less than 0.5 μm and is distinct from the lower nonmagnetic layer of the present invention. In the present invention, as well, an undercoating layer is desirably provided to enhance adhesion between the lower nonmagnetic layer and the support. The binder, lubricant, dispersing agents, additives, solvents, dispersion methods, and the like employed in the magnetic layer may be applied in the nonmagnetic layer. In particular, known techniques relating to the magnetic layer may be applied to the quantity and type of binder, additives, and quantity and type of dispersants added.

In the present invention, known additives can be added to both upper and lower layers. Substances having lubricating effects, antistatic effects, dispersion effects, plasticizing effects or the like may be employed as additives. Examples are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfiric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; and aliphatic amines having 8 to 22 carbon atoms.

Specific examples of compounds suitable for use are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, or sulfoniums; anionic surfactants comprising acid groups such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in "Surfactants Handbook" (published by Sangyo Tosho Co., Ltd.). These lubricants, antistatic agents and the like need not be 100 percent pure and may contain impurities, such as isomers, unreacted materials, by-products, decomposition products and oxides in addition to the main components. These impurities are preferably comprised equal to or less than 30 weight percent, and more preferably equal to or less than 10 percent, by weight.

The lubricants and surfactants that are employed in the present invention may be employed differently in the nonmagnetic layer and magnetic layer as needed based on type and quantity. For example, it is conceivable to control bleeding onto the surface through the use in the nonmagnetic layer and the magnetic upper layer of fatty acids having different melting points, to control bleeding onto the surface through the use of esters having different boiling points and polarities, to improve coating stability by adjusting the amount of surfactant, and to enhance the lubricating effect by increasing the amount of the lubricant added to the nonmagnetic layer; this is not limited to the examples given here. All or some of the additives used in the present invention may be added at any stage of the process of manufacturing the magnetic coating material. For example, they may be mixed with the ferromagnetic powder before a kneading step; added during a step of kneading the ferromagnetic powder, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons, such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention for the magnetic layer liquid and nonmagnetic layer liquid. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition not be less than the arithmetic mean value of the lower layer solvent composition. To improve dispersion properties, a solvent having a somewhat strong polarity is desirable. It is desirable that solvents having a dielectric constant equal to or higher than 15 is comprised equal to or higher than 50 percent of the solvent composition. Further, the dissolution parameter is desirably from 8 to 11.

Conventionally known thermoplastic resins, thermosetting resins, reactive resins, and mixtures thereof are employed as binder in the magnetic and nonmagnetic layers of the present invention. Thermoplastic resins have a glass transition temperature of −100 to 150° C., a number average molecular weight of 1,000 to 200,000, preferably 10,000 to 100,000, and a degree of polymerization of about 50 to 1,000. Examples are polymers and copolymers comprising structural units in the form of vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, and vinyl ether; polyurethane resins; and various rubber resins. Examples of thermosetting resins and reactive resins are phenol resins, epoxy reins, polyurethane-curing resins, urea resins, melamine resins, alkyd resins, acrylic reactive resins, formaldehyde resins, silicone resins, epoxy-polyamide resins, mixtures of polyester resin and isocyanate prepolymers, mixtures of polyester polyols and polyisocyanate, and mixtures of polyurethane and polyisocyanate.

These resins are described in detail in the "Handbook of Plastics" put out by Asakura Shoten. Known electron beam curing resins may be employed in the nonmagnetic and magnetic layers. Examples thereof and methods of manufacturing the same are described in detail in Japanese Unexamined Patent Publication (KOKAI) Showa No. 62-256219. These resins may be employed singly or in combination. Preferred resins are combinations of a polyurethane resin and one or more selected from among the group consisting of vinyl chloride resin, vinyl chloride vinyl acetate resin, vinyl chloride vinyl acetate vinyl alcohol resin, and vinyl chloride vinyl acetate maleic anhydride copolymer, as well as combinations thereof with polyisocyanate. Structures of polyurethane resin that are suitable for use are known structures such as polyester polyurethane, polyether polyurethane, polyether polyester polyurethane, polycarbonate polyurethane, polyester polycarbonate polyurethane, and polycaprolactone polyurethane. To improve dispersion properties and durability, a compound, in which at least one polar group selected from among the group consisting of COOM, $SO_3M$, $OSO_3M$, $P=O(OM)_2$, $O-P=O(OM)_2$ (wherein M denotes a hydrogen atom or alkali metal base), OH, $NR_2$, $N^+R_3$ (wherein R denotes a hydrocarbon group), epoxy groups, SH, and CN has been incorporated by copolymerization or addition reaction, is desirably employed as needed in all of the above-described binders. The quantity of the polar group is $10^{-1}$ to $10^{-8}$ mol/g, preferably $10^{-2}$ to $10^{-6}$ mol/g.

The binder in the magnetic layer of the present invention is employed in a range of 2 to 30 weight percent, preferably 5 to 25 weight percent with respect to the ferromagnetic powder. When employing vinyl chloride resin, the proportion is 1 to 30 weight percent, when employing polyurethane resin, 1 to 20 weight percent, and when employing polyisocyanate, 1 to 20 weight percent; these are preferably combined for use. When employing polyurethane in the present invention, a glass transition temperature of -50 to 100° C., an elongation at break of 100 to 2,000 percent, a stress at break of $4.9 \times 10^{-6}$ to $9.8 \times 10^{-4}$ GPa (0.05 to 10 kg/cm$^2$), and a yield point of $4.9 \times 10^{-6}$ to $9.8 \times 10^{-4}$ GPa (0.05 to 10 kg/cm$^2$) are preferred. The magnetic recording medium of the present invention comprises two or more layers. Accordingly, as needed, the quantity of binder; the proportion of vinyl chloride resin, polyurethane resin, polyisocyanate, or some other resin in the binder; the molecular weight of each resin comprising the magnetic layer; the quantity of polar groups; and the above-stated physical characteristics of the resin may be changed in the nonmagnetic layer, upper magnetic layer, or some other magnetic layer. Known techniques for the multilayered magnetic layer may be applied. For example, when changing the quantity of binder in the upper/lower layer or nonmagnetic layer, increasing the quantity of binder in the upper magnetic layer effectively decreases scratching of the surface of the magnetic layer, and increasing the quantity of binder in layers other than the magnetic layer imparts flexibility to achieve good head touch.

Examples of polyisocyanates preferably employed in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in both the nonmagnetic layer and the magnetic layer by exploiting differences in curing reactivity.

Examples of types of carbon black that are suitable for use in the magnetic layer of the present invention are: furnace black for rubber, thermal for rubber, black for coloring, and acetylene black. A specific surface area of 5 to 500 m$^2$/g, a DBP oil absorption capacity of 10 to 400 mL/100 g, a particle diameter of 5 nm to 300 nm, a pH of 2 to 10, a moisture content of 0.1 to 10 weight percent, and a tap density of 0.1 to 1 g/mL are desirable. Specific examples of types of carbon black employed in the present invention are: BLACK PEARLS 2000, 1300, 1000, 900, 800, 700 and VULCAN XC-72 manufactured by Cabot Corporation; #80, #60, #55, #50 and #35 manufactured by Asahi Carbon Co. Ltd.; #2400B, #2300, #900, #1000, #30, #40 and #10B manufactured by Mitsubishi Kasei Kogyo Corp.; and CONDUCTEX SC, RAVEN 150, 50, 40 and 15 manufactured by Columbia Carbon Co. Ltd. The carbon black employed may be surface-treated with a dispersant or the like, or grafted with resin, or have a partially graphite-treated surface. The carbon black may be dispersed in advance into the binder prior to addition to the magnetic coating material. These carbon blacks may be used singly or in combination.

When employing carbon black, the quantity preferably ranges from 0.1 to 30 weight percent with respect to the ferromagnetic powder. In the magnetic layer, carbon black works to prevent static buildup, reduce the coefficient of friction, impart light-blocking properties, enhance film strength, and the like; the properties vary with the type of carbon black. Accordingly, it is, as a matter of course, possible for carbon black used in the present invention to properly use varying the kinds, quantity and combination between the upper magnetic layer and lower nonmagnetic layer according to the purpose on the basis of the above-mentioned characteristics, such as particle size, oil absorption capacity, electrical conductivity, and pH. For example, the Carbon Black Handbook compiled by the Carbon Black Association may be consulted for types of carbon black suitable for use in the magnetic layer of the present invention.

Known materials with a Mohs' hardness equal to or higher than 6, principally in the form of α-alumina with an a conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, can be employed singly or in combination as abrasives in the present invention. Further, complexes of these abrasives (one abrasive that has been surface treated with another abrasive) may also be employed. There are cases where compounds or elements other than the principal components are contained in these abrasives; the effect does not change so long as the principal components account for equal to or higher than 90 weight percent. Abrasives with a particle size of 0.01 to 2 μm are preferred. Further, as needed, the same effect may be imparted by combining abrasives of differing particles sizes or widening the particle size distribution of a single abrasive. A tap density of 0.3 to 2 g/mL, a moisture content of 0.1 to 5 weight percent, a pH of 2 to 11, and a specific surface area of 1 to 30 m$^2$/g are preferred. The abrasive employed in the present invention may be acicular, spherical, or cubic in shape, but a partially angular shape is preferred for its good abrasive properties. Specific examples of abrasives employed in the present invention are AKP-20, AKP-30, AKP-50, HIT-50, and HIT-100 from Sumitomo Chemical Co., Ltd.; G5, G7, and S-1 from Nippon Chemical Industrial Co., Ltd.; and TF-100 and TF-140 from Toda Kogyo Corp. Different types, quantities, and combinations of abrasive may be employed in the magnetic layer (upper/lower layer) and nonmagnetic layer of the present invention based on the objective. These abrasives may be first dispersed in binder in advance and then added to the magnetic coating liquid. The number of abrasive particles present on the magnetic layer surface and magnetic layer side surfaces of the magnetic recording medium of the present invention is desirably equal to or higher than 5/100 μm$^2$.

Substances having lubricating effects, antistatic effects, dispersion effects, plasticizing effects, or the like may be employed as additives in the present invention. Examples are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; and aliphatic amines having 8 to 22 carbon atoms.

Specific examples of compounds suitable for use are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, or sulfoniums; anionic surfactants comprising acid groups such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in "Surfactants Handbook" (published by Sangyo Tosho Co., Ltd.). These lubricants, antistatic agents and the like need not be 100 percent pure and may contain impurities, such as isomers, unreacted materials, by-products, decomposition products and oxides in addition to the main components. These impurities are preferably comprised equal to or less than 30 weight percent, and more preferably equal to or less than 10 percent.

The lubricants and surfactants that are employed in the present invention may be employed differently in the nonmagnetic layer and magnetic layer as needed based on type and quantity. For example, it is conceivable to control bleeding onto the surface through the use in the nonmagnetic layer and the magnetic layer of fatty acids having different melting points, to control bleeding onto the surface through the use of esters having different boiling points and polarities, to improve coating stability by adjusting the amount of surfactant, and to enhance the lubricating effect by increasing the amount of the lubricant added to the nonmagnetic layer; this is not limited to the examples given here. All or some of the additives used in the present invention may be added at any stage of the process of manufacturing the magnetic coating material. For example, they may be mixed with the ferromagnetic powder before a kneading step; added during a step of kneading the ferromagnetic powder, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

Examples of the trade names of lubricants suitable for use in the present invention are: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid manufactured by NOF Corporation.; oleic acid manufactured Kanto Chemical Co. Ltd; FAL-205 and FAL-123 manufactured by Takemoto Oil & Fat Co., Ltd.; NJLUB LO, NJLUB IPM, and Sansosyzer E4030 manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 manufactured by Shin-Etsu Chemical Co. Ltd.; Armide P, Armide C and Armoslip CP manufactured by Lion Armour Co., Ltd.; Duomine TDO manufactured by Lion Corporation; BA-41G manufactured by Nisshin Oil Mills, Ltd.; Profan 2012E, Newpole PE61, Ionet MS-400, Ionet MO-200, Ionet DL-200, Ionet DS-300, Ionet DS-1000 and Ionet DO-200 manufactured by Sanyo Chemical Industries, Ltd.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons, such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylfonnamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention for the magnetic layer liquid and nonmagnetic layer liquid. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition not be less than the arithmetic mean value of the lower layer solvent composition. To improve dispersion properties, a solvent having a somewhat strong polarity is desirable. It is desirable that solvents having a dielectric constant equal to or higher than 15 is comprised equal to or higher than 50 percent of the solvent composition. Further, the dissolution parameter is desirably from 8 to 11.

In the configuration of the magnetic recording medium of the present invention, the thickness of the flexible nonmagnetic support ranges from 1 to 100 µm, preferably from 4 to 80 µm. The combined thickness of the magnetic layer and nonmagnetic layer ranges from 1/100$^{th}$ to twice that of the flexible nonmagnetic support. Further, an undercoating layer can be provided between the flexible nonmagnetic support and the nonmagnetic layer to enhance adhesion. The undercoating layer ranges from 0.01 to 2 µm, preferably from 0.02 to 0.5 µm in thickness. A backcoating layer may also be provided on the side of the flexible nonmagnetic support opposite from the magnetic layer side. The thickness thereof ranges from 0.1 to 2 µm, preferably from 0.3 to 1.0 µm. Known undercoating layers and backcoating layers are employed.

A known film in the form of a polyester such as polyethylene terephthalate or polyethylene naphthalate, polyolefins, cellulose triacetate, polycarbonate, polyamide, polyimide, polyamidoimide, polysulfine, aramide, and aromatic polyamides may be employed as the flexible nonmagnetic support employed in the present invention. The supports may be in advance subjected to corona discharge treatment, plasma treatment, adhesion enhancing treatment, heat treatment, dust removal, or the like. To achieve the object of the present invention, the flexible nonmagnetic support must have a centerline average surface roughness (cutoff value 0.25 mm) equal to or less than 0.03 µm, preferably equal to or less than 0.02 µm, and still more preferably, equal to or less than 0.01 µm. These flexible nonmagnetic supports not only have a low centerline average surface roughness, but also desirably have no coarse protrusions equal to or higher than 1 µm. The roughness shape of the surface can be freely controlled as needed through the size and quantity of filler added to the support. Examples of such fillers are oxides and carbonates of Ca, Si, Ti, and the like, as well as organic micropowders of acrylics and the like. The F-5 value in the tape running direction of the nonmagnetic support employed in the present invention desirably ranges from 0.049 to 0.49 GPa (5 to 50 kg/mm$^2$) and the F-5 value in the tape width direction desirably ranges from 0.0294 to 0.294 GPa (3 to 30 kg/mm$^2$). Although the F-5 value in the longitudinal direction of the tape is normally greater than the F-5 value in the width direction of the tape, this does not apply when there is a particular need to increase the strength in the width direction.

The thermal shrinkage rate at 100° C. at 30 minutes in the tape running direction and the width direction of the support is preferably equal to or less than 3 percent, more preferably equal to or less than 1.5 percent, and the thermal shrinkage rate at 80° C. at 30 minutes is preferably equal to or less than 1 percent, and more preferably equal to or less than 0.5 percent. The break strength in both directions preferably ranges from 0.049 to 0.98 GPa (5 to 100 kg/mm$^2$) and the modulus of elasticity preferably ranges from 0.98 to 19.6 GPa (100 to 2000 kg/mm$^2$).

The steps of manufacturing the magnetic coating material of the magnetic recording medium of the present invention comprise at least a kneading step, a dispersing step, and a mixing step provided as needed before and/or after these other steps. Each of the individual steps may be divided into two or more stages. The magnetic liquid comprised principally of ferromagnetic powder and binder, and the nonmagnetic liquid comprised principally of nonmagnetic powder and binder, are desirably separately kneaded, dispersed, and mixed. The starting materials such as the carbon black with a particle size equal to or higher than 60 nm added to ensure running durability, abrasives, antistatic agents, lubricants, and solvents may be added at the beginning of, or during, any of the steps.

In the present invention, conventionally known-manufacturing techniques may of course be utilized for some of the steps. In the kneading step, by using a kneader having a strong kneading force, such as a continuous kneader or a pressure kneader, it is possible to obtain the magnetic recording medium of the present invention having the high residual magnetic flux density (Br). When a continuous kneader or pressure kneader is employed, the ferromagnetic powder and all or part of the binder (preferably equal to or higher than 30 percent of the entire quantity of binder) are kneaded in the range of 15 to 500 parts by weight per 100 parts by weight of ferromagnetic powder. Details of the kneading treatment are described in Japanese Unexamined Patent Publication (KOKAI) Heisei No. 1-106338 and Japanese Unexamined Patent Publication (KOKAI) Showa No. 64-79274. When preparing the lower nonmagnetic layer liquid, a dispersing medium having a high specific gravity is desirably utilized, with zirconia beads being suitable.

The followings are examples of devices and methods for coating the magnetic recording medium having a multilayered structure of the present invention.

1. The lower layer is first applied with a coating device commonly employed to apply magnetic liquid such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672.

2. The upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei Nos. 2-17971, and 2-265672.

3. The upper and lower layers are applied nearly simultaneously using an extrusion coating apparatus with a backup roller as disclosed in Japanese Unexamined Patent Publication (KOKAI) Heisei No. 2-174965.

To prevent compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No.3-8471. To achieve the magnetic recording medium of the present invention, an orientation intensity of the range given below is desirably imparted. Orientation magnetic field intensity H is equal to or higher than 0.4 times and equal to or less than 1.5 times, preferably equal to or higher than 0.5 times and equal to or less than 1.2 times, the Hc of the magnetic material. A combination of solenoid and cobalt magnet with like poles opposed is desirably employed. When just cobalt magnets with like poles opposed are employed, the position is desirably set at a spot where the magnetic layer has dried somewhat but has not yet completely lost fluidity. When applying the present invention to a disk medium, a randomizing orientation method is rather necessary. However, orientation magnetic field intensity H desirably falls within the above-stated range.

Heat-resistant plastic rollers of epoxy, polyimide, polyamide, polyimidoamide or the like are employed as calender processing rollers. Processing may also be conducted with metal rollers. The processing temperature is preferably equal to or higher than 70° C., more preferably equal to or higher than 80° C. Linear pressure is desirably 200 kg/cm, more preferably equal to or higher than 300 kg/cm. The friction coefficient for SUS420J of the magnetic layer surface of the magnetic recording medium of the present invention and its opposite surface is preferably equal to or less than 0.5, more preferably equal to or less than 0.3. The specific surface resistivity preferably ranges from $10^4$ to $10^{12}$ Ω/sq, the modulus of elasticity at 0.5 percent elongation of the magnetic layer in both the running direction and the width direction preferably ranges from 0.98 to 19.6 GPa (100 to 2000 kg/mm$^2$) and the break strength preferably ranges from 0.0098 to 0.29 GPa (1 to 30 kg/mm$^2$). The modulus of elasticity of the magnetic recording medium in both the running direction and the longitudinal direction preferably ranges from 0.98 to 14.7 GPa (100 to 1500 kg/mm$^2$) and the residual elongation is preferably equal to or less than 0.5 percent. The thermal shrinkage rate at any temperature equal to or less than 100° C. is preferably equal to or less than 1 percent, more preferably equal to or less than 0.5 percent, and most preferably equal to or less than 0.1 percent. The glass transition temperature (i.e., the temperature at which the loss elastic modulus of dynamic viscoelasticity as measured at 110 Hz peaks) of the magnetic layer is preferably equal to or higher than 50° C. and equal to or less than 120° C., and that of the lower nonmagnetic layer preferably ranges from 0° C. to 100° C. The loss elastic modulus preferably falls within a range of $1\times10^3$ to $8\times10^4$ N/cm$^2$ ($1\times10^8$ to $8\times10^9$ dyne/cm$^2$) and the loss tangent is preferably equal to or less than 0.2. Adhesion failure tends to occur when the loss tangent becomes excessively large.

The residual solvent in the magnetic layer is preferably equal to or less than 100 mg/m$^2$ and more preferably equal to or less than 10 mg/m$^2$, and the residual solvent contained in the second layer is preferably less than the residual solvent contained in the first layer. In both the nonmagnetic lower layer and the magnetic layer, the void ratio is preferably equal to or less than 30 volume percent, more preferably equal to or less than 20 volume percent. Although a low void ratio is preferable for attaining high output, there are some cases in which it is better to maintain a certain level based on the objective. For example, in magnetic recording media for data recording where repeat applications are important, higher void ratios often result in better running durability. As regards the magnetic characteristics of the magnetic recording medium of the present invention, when measured under a magnetic field of 398 kA/m (5 kOe), squareness in the tape running direction is equal to or higher than 0.70, preferably equal to or higher than 0.80, and more preferably equal to or higher than 0.90. Squareness in the two directions perpendicular to the tape running direction is preferably equal to or less than 80 percent of the squareness in the running direction. The switching field distribution (SFD) of the magnetic layer is preferably equal to or less than 0.6. The centerline surface roughness (cutoff value 0.25 mm) Ra of the magnetic layer desirably ranges from 1 to 10 nm; however, this value is suitably set based on the objective. To improve electromagnetic characteristics, the smaller Ra is the better. However, to improve running durability, the bigger Ra is the better. The RMS (mean square) surface roughness $R_{RMS}$ as evaluated by atomic force microscope (AFM) desirably falls within a range of 2 to 15 nm.

The magnetic recording medium of the present invention comprises a lower nonmagnetic layer and an upper magnetic layer. It will be readily understood that the physical characteristics of the nonmagnetic layer and the magnetic layer can be changed based on the objective. For example, the magnetic layer can be imparted with a high modulus of elasticity to improve running durability while at the same time imparting to the nonmagnetic layer a lower modulus of elasticity than that of the magnetic layer to improve head contact with the magnetic recording medium. What physical characteristics to be imparted to two or more magnetic layers can be determined by consulting techniques relating to known magnetic multilayers. For example, there are many inventions imparting a higher Hc to the upper magnetic layer than to the lower layer, such as disclosed in Japanese Examined Patent Publication (KOKOKU) Showa No. 37-2218 and Japanese Unexamined Patent Publication (KOKAI) Showa No. 58-56228. However, making the magnetic layer thin as in the present invention permits recording even on a magnetic layer of comparatively high Hc.

[Embodiments]

The detailed contents of the present invention are described specifically below through embodiments. In the embodiments, "parts" denote "parts by weight".

(1) Nonmagnetic layer

| | | |
|---|---|---|
| Nonmagnetic powder α-Fe$_2$O$_3$ | | 80 parts |
| Mean major axis length | 0.1 μm | |
| Specific surface area by BET method | 48 m$^2$/g | |
| pH | 8 | |
| Fe$_2$O$_3$ content | 90% or more | |
| DBP oil absorption capacity | 27 to 38 ml/100 g | |
| Surface treatment agent | Al$_2$O$_3$ | |
| Carbon black | | 20 parts |
| Mean primary particle diameter | 16 nm | |
| DBP oil absorption capacity | 80 ml/100 g | |
| pH | 8.0 | |
| Specific surface area by BET method | 250 m$^2$/g | |
| Volatile component | 1.5% | |
| Phenyl phosphonic acid | | 3 parts |
| Vinyl chloride copolymer | | 8 parts |
| MR-110 manufactured by Nippon Zeon Co., Ltd. | | |
| Polyester polyurethane resin | | |
| Neopentylglycol/caprolactone polyol/MDI (4,4'-diphenylmethane diisocyanate) = 0.9/2.6/1 | | |
| 1 × 10$^{-4}$ eq/g —SO$_3$Na group content., Tg = 65° C. | | |
| Butyl stearate | | 1 part |
| Stearic acid | | 1 part |
| Methyl ethyl ketone | | 100 parts |
| Cyclohexanone | | 50 parts |
| Toluene | | 50 parts |

(2) Magnetic layer

| | | |
|---|---|---|
| Ferromagnetic metal powder (referring to Tables 1 and 2) | | 100 parts |
| Nonmagnetic powder X (referring to Table 1 and 2) Referring to Tables 1 and 2 | | |
| Phenyl phosphonic acid | | 5 parts |
| Vinyl chloride copolymer | | 6 parts |
| MR-110 manufactured by Nippon Zeon Co., Ltd. | | |

-continued

| | |
|---|---|
| Polyester polyurethane resin<br>Neopentylglycol/caprolactone<br>polyol/MDI (4,4'-diphenylmethane<br>diisocyanate) = 0.9/2.6/1<br>1 × $10^{-4}$ eq/g —$SO_3Na$ group content.,<br>Tg = 65° C. | 12 parts |
| α-alumina (particle size: 0.18 μm) | 10 parts |
| Carbon black (particle size: 0.09 μm) | 6 parts |
| Butyl stearate | 1 part |
| Stearic acid | 1 part |
| Methyl ethyl ketone | 120 parts |
| Cyclohexanone | 120 parts |

In the coating liquid of the nonmagnetic layer, the individual components were kneaded in a continuous kneader and then dispersed with zirconia beads in a sand mill. To the dispersion obtained were added four parts of polyisocyanate. In the magnetic layer, all components other than nonmagnetic powder X, the vinyl chloride copolymer, 60 parts of methyl ethyl ketone, and 60 parts of cyclohexanone were kneaded in an open kneader and then dispersed for 1.5 hr with zirconia beads 1 mm in diameter with a sand mill. The remaining components were then separately kneaded, dispersed for 6 hr with zirconia beads 0.3 mm in diameter, filtered, combined with the dispersed magnetic coating material, and dispersed for 0.5 hr with zirconia beads 1 mm in diameter to prepare the magnetic liquid. Forty parts of a mixed solvent of methyl ethyl ketone and cyclohexanone were then added to each of the nonmagnetic layer and magnetic layer dispersion liquids and the liquids were passed through a filter with a mean pore size of 1 μm to prepare the nonmagnetic layer and magnetic layer coating liquids. Simultaneous multilayer coating was conducted by applying the nonmagnetic layer coating liquid obtained in a quantity corresponding to a dry thickness of 1.5 μm, and immediately applying thereover the magnetic layer in a quantity corresponding to a dry thickness of 0.08 μm, on a polyethylene naphthalate support 5.2 μm in thickness and having a centerline surface roughness (cutoff value 0.25 mm) of 0.01 μm. While the two layers were still wet, they were oriented in the longitudinal direction with a 250 mT (2,500 G) permanent magnet and a 150 mT (1,500 G) solenoid. The layers were then dried, processed with a seven-stage calender comprising just metal rolls at a temperature of 80□, a linear pressure of 350 kg/cm, and a rate of 50 m/min. Following calendering, the product was slit to 6.35 mm to obtain tape.

Evaluation Methods (1) Output and the CNR were measured with a drum tester. A relative velocity of 10.5 m/sec was employed. An MIG head with a Bs of 1.2 T, a gap length of 0.22 μm, and a track width of 18 μm was employed as the recording head to record a single frequency (21 MHz) signal with a recording wavelength of 0.5 μm with an optimum recording current. A SAL bias-type A-MR head with a track width of 6 μm and an intershield gap length of 0.2 μm was employed in reproduction. The reproduced signal was frequency analyzed with a spectrum analyzer from Shibasoku and the ratios of the 21 MHz output to noise level after DC erase and the noise level at 23 MHz were respectively taken as the CNR and the near CNR.

(2) Magnetic Pinholes (Magnetic Gaps)

A ferricolloidal solution with a mean particle size of 0.02 μm was applied to and dried on a tape that had been recorded at a wavelength of 0.5 μm with the above-described recording head. Photographs were taken of 10 random fields (each field having a surface area of 2.1 μm×1.7 μm=3.57 μm) at a magnification of 50,000 by electron microscope (SEM) and the surface area on which there were no ferricolloidal particles was measured. The maximum magnetic gap area $S_{max}$ and the total area S of magnetic gaps were calculated for the examined surface area (35.7 μm) of magnetic gaps. The ratio of the maximum magnetic gap surface area per bit surface area was obtained by dividing the above-measured maximum magnetic gap surface area $S_{max}$ by the bit surface area (in the present invention, the bit length 0.25 μm×6 μm=1.5 $μm^2$). The examined surface area of magnetic gaps is desirably kept to equal to or higher than 20 times the bit surface area to enhance precision.

(3) Hc, Br, SQ

They were measured at Hm 796 kA/m (10 kOe) with a vibrating sample magnetometer (made by Toei Kogyo Co., Ltd.).

(4) Remanence Measurement

After AC demagnetization of the sample, the above-described magnetometer (Hm 796 kA/m (10 kOe)) was employed to measure alternating current and direct current demagnetization remanence. ΔHr=H0.5−Hr was employed as a magnetic interaction indicator for a magnetic field H 0.5 causing reversal of 50 percent of the magnetic particles from a state of alternating current demagnetization and a magnetic field Hr causing the alternating current demagnetization remanence Mr(s) to go to zero at saturation magnetization. ΔHr going to zero indicates the lack of magnetic interaction. When ΔHr>0, magnetic coupling between magnetic particles was generated so as to cause demagnetization by an applied magnetic field. The smaller ΔHr, the less magnetic interaction indicates.

(5) Ratio of Volume of Magnetic Powder to the Volume of Magnetic Layer

The total volume of nonvolatile components was calculated from the weight and specific gravity (recorded below) of magnetic layer composition components other than solvents. Further, the void rate in the magnetic layer was obtained by the nitrogen adsorption method, this was added to the nonvolatile component volume, and the ratio of volume of magnetic powder to the volume of magnetic layer was calculated.

The ratio of volume of magnetic powder to the volume of magnetic layer=(magnetic material volume)/[total volume of nonvolatile components]/{100-void rate}/100}]×100

| | Specific gravity |
|---|---|
| Fe—Co magnetic material | 6.8 |
| α-$Fe_2O_3$ | 5.2 |
| $ZrO_2$ | 6 |
| Carbon black | 1.8 |
| Resin binder | 1.3 |
| Alumina | 4 |
| Lubricant | 1.3 |

(6) Volume Ratio of Nonmagnetic Powder/Magnetic Powder

In the same manner as set forth above, the volume of nonmagnetic powder and the volume of magnetic powder were calculated from the weight and specific gravity (given below) of the magnetic layer composition components, and the volume ratio was obtained.

(7) Thickness Measurement

A sample tape was cut with a diamond cutter to a thickness of about 0.1 μm in the longitudinal direction, the cut sample was observed and photographed at a magnification of 100,000 times by transmission electron microscopy, lines were drawn on the magnetic layer surface and magnetic layer/nonmagnetic layer interface, and measurements were made with an IBAS2 Inage Processor from Zeiss. For a measured length of 21 cm, 85-300 measurements were taken and the average value δ and standard deviation σ were calculated.

(8) Ra

Centerline average roughness Ra was measured at a cutoff of 0.25 mm by optical interference with a Digital Optical Profimeter (made by WYKO). Power spectrum density (PSD): Using the same measurement device, the squares of the sampling interval and height were multiplied to calculate. The unit was $nm^3$. The PSD was obtained for a sampling interval of 10 μm.

(9) AFM Surface Protrusions

A Nanoscope 3 device from Digital Instruments Co. was employed to measure the surface roughness at a square angle of 30 μm using a probe in the form of a rectangular drill of SiN with a rigid of 70 degrees. The number of protrusions extending to a height equal to or higher than 20 nm above the reference surface was counted.

TABLE 1

| | | Embodiment 1 | Embodiment 2 | Embodiment 3 | Embodiment 4 | Embodiment 5 |
|---|---|---|---|---|---|---|
| Magnetic material | Magnetic material | A | → | → | → | → |
| | Major axis length 1j of magnetic material: nm | 60 | → | → | → | → |
| | Minor axis length 1m of magnetic material: nm | 13 | → | → | → | → |
| | Hc of magnetic material: kA/m | 169 | → | → | → | → |
| | σ s of magnetic material: $Am^2$/kg | 109 | → | → | → | → |
| Nonmagnetic powder x | Kind of nonmagnetic powder | α-$Fe_2O_3$ | → | → | $ZrO_2$ | α-$Fe_2O_3$ |
| | Shape of nonmagnetic powder | Acicular | → | Granular | → | Granular |
| | Major axis length of nonmagnetic powder: nm | 63 | → | (10) | → | (30) |
| | Minor axis length of nonmagnetic powder: 1h nm | 9 | → | 10 | → | 30 |
| | Addition amount: weight parts | 50 | 10 | 20 | → | 20 |
| | 1h/1m ratio | 0.69 | → | 0.77 | → | 2.31 |
| Magnetic layer structure | Volume ratio of above nonmagnetic powder/magnetic material: % | 65.4 | 13.1 | 26.2 | 22.7 | 26.2 |
| | Ratio of volume of magnetic powder to the volume of magnetic layer: % (void percentage: %) | 26.9 (15) | 33.1 (13) | 30.8 (15) | 31.2 (15) | 31.0 (20) |
| | Condition of preparing magnetic liquid | Magnetic and nonmagnetic liquids were separately kneaded and dispersed. | | | | |
| Orientation | Intensity of orientation magnetic field (kA/m) dipolar opposed/solenoid | 199/119 | → | → | → | 199/119 |
| Layer structure | Average thickness of magnetic layer δ:μm | 0.08 | 0.08 | 0.08 | 0.08 | 0.08 |
| | Standard deviation of thickness of magnetic layer: μm | 0.018 | 0.026 | 0.023 | 0.022 | 0.03 |
| | Thickness of nonmagnetic layer: μm | 1.5 | → | → | → | → |
| Surface property of magnetic layer | Ra: nm | 2.1 | 2.3 | 2.2 | 2.1 | 2.4 |
| | 10 μm-PSD: $nm^3$ | 4000 | 5500 | 4500 | 4100 | 6000 |
| | AFM projections: pieces | 18 | 19 | 19 | 20 | 20 |
| Magnetic characteristics of medium | Hc: kA/m | 195 | 193 | 194 | 194 | 196 |
| | SQ | 0.84 | 0.86 | 0.84 | 0.82 | 0.80 |
| | Br: T | 0.210 | 0.265 | 0.241 | 0.238 | 0.230 |
| Magnetic gaps | Maximum surface area of magnetic gaps: $μm^2$ | 0.12 | 0.08 | 0.06 | 0.12 | 0.03 |
| | Above-mentioned/bit surface area ratio: % | 8 | 5.3 | 4 | 8 | 2 |
| Electromagnetic characteristics | CNR: dB | 2 | 0.5 | 1 | 1.4 | 0.8 |
| | Near CNR: dB | 4 | 1 | 2.5 | 3 | 0.6 |
| Remanence | Δ Hr: A/m | 398 | 3184 | 1433 | 1194 | 1114 |

TABLE 2

| | | Comp. Ex. 1 | Comp. Ex. 2 | Comp. Ex. 3 | Comp. Ex. 4 |
|---|---|---|---|---|---|
| Magnetic material | Magnetic material | A | → | B | A |
| | Major axis length 1j of magnetic material: nm | 60 | → | 110 | 60 |
| | Minor axis length 1m of magnetic material: nm | 13 | → | 20 | 13 |
| | Hc of magnetic material: kA/m | 169 | → | 195 | 169 |
| | σ s of magnetic material: $Am^2$/kg | 109 | → | 155 | 109 |
| Nonmagnetic powder x | Kind of nonmagnetic powder | None | α-$Fe_2O_3$ | → | $ZrO_2$ |
| | Shape of nonmagnetic powder | — | Acicular | → | Granular |
| | Major axis length of nonmagnetic powder: nm | — | 240 | 63 | (10) |
| | Minor axis length of nonmagnetic powder: 1h nm | — | 40 | 9 | 10 |
| | Addition amount: weight parts | — | 50 | → | → |
| | 1h/1m ratio | — | 3.08 | 0.45 | → |

TABLE 2-continued

|  |  | Comp. Ex. 1 | Comp. Ex. 2 | Comp. Ex. 3 | Comp. Ex. 4 |
|---|---|---|---|---|---|
| Magnetic layer structure | Volume ratio of above nonmagnetic powder/magnetic material: % | 0 | 65.4 | → | 56.7 |
|  | Ratio of volume of magnetic powder to the volume of magnetic layer: % (void percentage: %) | 34.8 (13) | 26.0 (18) | → (→) | 26.7 (18) |
|  | Condition of preparing magnetic liquid | Only magnetic liquid was kneaded and dispersed. | Simultaneous kneading and dispersing | | |
| Orientation | Intensity of orientation magnetic field (kA/m) dipolar opposed/solenoid | 478/119 | → | → | → |
| Layer structure | Average thickness of magnetic layer δ:μm | 0.08 | 0.08 | 0.08 | 0.08 |
|  | Standard deviation of thickness of magnetic layer: μm | 0.03 | 0.034 | 0.032 | 0.026 |
|  | Thickness of nonmagnetic layer: μm | 1.5 | → | → | → |
| Surface property of magnetic layer | Ra: nm | 2.4 | 2.6 | 2.5 | 2.3 |
|  | 10 μm-PSD: nm$^3$ | 7000 | 8500 | 9500 | 6200 |
|  | AFM projections: pieces | 18 | 22 | 21 | 17 |
| Magnetic characteristics of medium | Hc: kA/m | 193 | 196 | 193 | 196 |
|  | SQ | 0.87 | 0.78 | 0.89 | 0.78 |
|  | Br: T | 0.275 | 0.189 | 0.306 | 0.194 |
| Magnetic gaps | Maximum surface area of magnetic gaps: μm$^2$ | 0.06 | 0.9 | 0.8 | 1.2 |
|  | Above-mentioned/bit surface area ratio: % | 4 | 60 | 53 | 80 |
| Electromagnetic characteristics | CNR: dB | 0 | −1.5 | −7.5 | −1.2 |
|  | Near CNR: dB | 0 | −4.5 | −5.5 | −6 |
| Remanence | Δ Hr: A/m | 4776 | 1990 | 11940 | 955 |

DESCRIPTIONS OF EMBODIMENTS AND COMPARATIVE EXAMPLES

Comparative Example 1 is an example in which microgranular ferromagnetic metal powder was employed without incorporation of the nonmagnetic powder of the present invention; this was employed as the reference for evaluation.

Comparative Example 2 is an example in the form of a reproduction of the invention described in Japanese Unexamined Patent Publication (KOKAI) Heisei No. 11-73640. However, since there is no disclosure of the shape or size of α-Fe$_2$O$_3$ in the magnetic layer in this Publication, α-Fe$_2$O$_3$ with a major axis length of 240 nm and a minor axis length of 40 nm was added to the magnetic layer of Comparative Example 1. In manufacturing the magnetic liquid, the nonmagnetic powder and magnetic powder were simultaneously kneaded and simultaneously dispersed. During orientation following application, a magnetic field intensity of 478 kA/m was applied with dipolar opposed magnets, after which a magnetic field intensity of 119 kA/m was applied with a solenoid to prepare a sample. There was less magnetic interaction than in Comparative Example 1, but the maximum surface area of magnetic pinholes became quite large. The SQ dropped, the standard deviation of the magnetic layer thickness increased, and the surface roughness at a long wavelength of 10 μm-PSD increased. Both the CNR and near CNR dropped, with the drop in near CNR being particularly sharp.

Embodiments 1 to 5 are embodiments of the present invention.

Embodiment 1 had a magnetic layer with an average thickness δ of 0.08 μm, a mean major axis length lj of 60 nm, a mean minor axis length ml of less than 13 nm, a ratio (lh/lm) of 0.69 of the ferromagnetic metal powder, and a maximum surface area K of magnetic gaps (pinholes) of 8 percent of the bit surface area. As a result, ΔHr decreased and both the CNR and near CNR improved.

Embodiment 2 comprised a magnetic layer with an average thickness δ of 0.08 μm, ferromagnetic metal powder with a mean major axis length lj of 60 nm, an average minor axis length lm of less than 13 nm, a ratio (lh/lm) of 0.69, and a magnetic gap (pinhole) maximum surface area K of 5.3 percent of the bit surface area. In Embodiment 2, the volume ratio of nonmagnetic powder was less than in Embodiment 1. As a result, the CNR and near CNR were better than in Comparative Example 1. However, the improvement in ΔHr, CNR, and near CNR was somewhat less than in Embodiment 1.

Embodiment 3 comprised a magnetic layer with an average thickness δ of 0.08 μm, ferromagnetic metal powder with a mean major axis length lj of 60 nm, an average minor axis length lm of less than 13 nm, a ratio (lh/lm) of 0.77, and a magnetic gap (pinhole) maximum surface area K of 4 percent of the bit surface area. Embodiment 3 is an example in which granular nonmagnetic powder was employed to lower the volume ratio of nonmagnetic powder lower than in Embodiment 1. In Embodiment 3, the volume ratio of nonmagnetic powder was higher than in Embodiment 2. As a result, the ΔHr was lower and the CNR and near CNR were better than in Comparative Example 1. Although the improvement in ΔHr, CNR, and near CNR was somewhat less than in Embodiment 1, it was greater than in Embodiment 2.

Embodiment 4 comprised a magnetic layer with an average thickness δ of 0.08 μm, ferromagnetic metal powder with a mean major axis length lj of 60 nm, an average minor axis length lm of less than 13 nm, a ratio (lh/lm) of 0.77, and a magnetic gap (pinhole) maximum surface area K of 8 percent of the bit surface area. Embodiment 4 is an example in which nonmagnetic powder was replaced with zirconia to render the volume ratio of nonmagnetic powder even lower than in Embodiment 1. As a result, the ΔHr was lower and the CNR and near CNR were better than in Comparative Example 1. Although the volume ratio of nonmagnetic powder was lower than in Embodiment 3, the ΔHr decreased and CNR and near CNR improved.

Embodiment 5 is an example in which the particle size of the nonmagnetic powder was increased relative to Embodiment 3 to increase the ratio (lh/lm) to 2.31. ΔHr decreased and CNR and near CNR improved relative to Comparative Example 1. Although the ΔHr decreased, the near CNR dropped relative to Embodiment 3.

Comparative Example 3 is an example in which the magnetic material in the magnetic liquid of Embodiment 1 was replaced with ferromagnetic metal powder having a major axis length of 110 nm, a minor axis length of 20 nm, an Hc of 195 kA/m (2,450 Oe), and a σs of 155 Am$^2$/kg and the magnetic liquid was prepared, coated, and then oriented under the conditions as those of Comparative Example 2. The magnetic interaction and the maximum surface area of magnetic pinholes were greater than in Embodiment 1. As a result, precipitous drops in CNR and near CNR were confirmed.

Comparative Example 4 is an example in which the quantity of nonmagnetic powder X added to the magnetic liquid of Embodiment 4 was increased and the magnetic liquid was prepared and oriented under the same conditions as in Embodiment 2. Thus, the ratio of the maximum surface area of magnetic pinholes to the bit surface exceeded the range of the present invention. Although the long wavelength surface roughness at 10 μm-PSD and magnetic interaction decreased, the CNR and near CNR dropped. The near CNR dropped particularly sharply.

The present invention provides a magnetic recording medium with good electromagnetic characteristics with MR heads and good production properties. In particular, the present invention provides a magnetic recording medium affording good recording and reproduction performance at short recording wavelengths and good yields.

The present disclosure relates to the subject matter contained in Japanese Patent Application No. 2001-047138 filed on Feb. 22, 2001, which is expressly incorporated herein by reference in its entirety.

What is claimed is:

1. A magnetic recording medium comprising a nonmagnetic layer comprising a nonmagnetic powder and a binder and a magnetic layer comprising a ferromagnetic metal powder, a binder and a nonmagnetic powder provided in this order on a flexible nonmagnetic support, wherein said magnetic layer has an average thickness ranging from 0.01 to 0.2 μm, said ferromagnetic metal powder has a mean major axis length of less than 100 nm and a mean minor axis length of less than 20 nm, said nonmagnetic powder comprised in the magnetic layer is a granular or acicular nonmagnetic powder, the ratio of the mean particle size or minor axis length of said nonmagnetic powder to said mean minor axis length is higher than 0.2 and equal to or less than 2.5, and the maximum surface area of magnetic pinholes is equal to or less than 50% of a bit surface area.

2. The magnetic recording medium of claim 1, wherein said maximum surface area of magnetic pinholes is from 0.1 to 20% of a bit surface area.

3. The magnetic recording medium of claim 1, wherein said magnetic layer has a ratio of volume of magnetic powder to the volume of magnetic layer ranging from 15 to 45%.

4. The magnetic recording medium of claim 1, wherein said magnetic layer has a ratio of the volume of the nonmagnetic powder to the volume of the magnetic powder ranging from 0.05 to 2.

5. The magnetic recording medium of claim 1, wherein said average thickness of the magnetic layer ranges from Tb/20 to Tb wherein Tb denotes the shortest bit length of recording signal.

6. The magnetic recording medium of claim 1, wherein said nonmagnetic powder contained in the magnetic layer comprising acicular particles with a major axis length equal to or less than 0.2 μm and an acicular ratio ranging from 3 to 20 or granular particles with a mean particle size equal to or less than 50 nm.

7. The magnetic recording medium of claim 1, wherein said ferromagnetic metal powder has a coercivity of not less than 158 kA/m.

8. The magnetic recording medium of claim 1, wherein said ferromagnetic metal powder has a saturation magnetization less than 130 Am$^2$/kg and equal to or higher than 70 Am$^2$/kg.

9. The magnetic recording medium of claim 1, wherein said ferromagnetic metal powder has a mean major axis length of equal to or higher than 40 nm to less than 100 nm.

10. A method of manufacturing the magnetic recording medium of claim 1 comprising coating a coating liquid for a nonmagnetic layer comprising a nonmagnetic powder and a binder and a coating liquid for a magnetic layer comprising a ferromagnetic metal powder, a binder and a nonmagnetic powder in this order on a flexible nonmagnetic support, wherein a liquid comprising said ferromagnetic metal powder and said binder and a liquid comprising said nonmagnetic powder and said binder are independently kneaded and dispersed until the dispersibility of said ferromagnetic metal powder and said nonmagnetic powder are optimized, and two liquid obtained are mixed and dispersed immediately prior to coating to obtain said coating liquid for a magnetic layer.

* * * * *